US009525556B2

(12) United States Patent
Park et al.

(10) Patent No.: US 9,525,556 B2
(45) Date of Patent: Dec. 20, 2016

(54) METHOD AND SYSTEM FOR ISSUING CSR CERTIFICATE FOR VEHICLE-TO-ANYTHING COMMUNICATION

(71) Applicants: Hyundai Motor Company, Seoul (KR); Penta Security System Inc., Seoul (KR)

(72) Inventors: Jong Rok Park, Seoul (KR); Cho Rong Ryu, Incheon (KR); Dae Sung Hwang, Gyeonggi-Do (KR); Su Lyun Sung, Gyeonggi-Do (KR); Dong Gyu Noh, Gyeonggi-Do (KR); Hahk Rel Noh, Gyeonggi-Do (KR); Duk Soo Kim, Seoul (KR); Sang Gyoo Sim, Seoul (KR); Eun Ho Shin, Seoul (KR); Jung Bai Kim, Seoul (KR); Byung Gwan Kim, Seoul (KR); Seok Woo Lee, Seoul (KR); You Sik Lee, Gyeonggi-Do (KR)

(73) Assignees: Hyundai Motor Company, Seoul (KR); Penta Security System Inc., Seoul (KR)

(*) Notice: Subject to any disclaimer, the term of this patent is extended or adjusted under 35 U.S.C. 154(b) by 0 days.

(21) Appl. No.: 14/570,912

(22) Filed: Dec. 15, 2014

(65) Prior Publication Data

US 2016/0087804 A1    Mar. 24, 2016

(30) Foreign Application Priority Data

Sep. 24, 2014    (KR) .................. 10-2014-0127418

(51) Int. Cl.
*H04L 9/32* (2006.01)
*H04L 29/06* (2006.01)
(Continued)

(52) U.S. Cl.
CPC ......... *H04L 9/3268* (2013.01); *H04L 63/0823* (2013.01); *H04L 67/12* (2013.01);
(Continued)

(58) Field of Classification Search
CPC .. H04L 9/0891; H04L 9/3268; H04L 63/0823; H04L 67/12; H04L 2209/84; H04W 12/04; H04W 12/06; H04W 12/08; H04W 4/046
See application file for complete search history.

(56) References Cited

U.S. PATENT DOCUMENTS 7,934,095 B2 * 4/2011 Laberteaux ............. H04L 9/006
            713/169
8,549,284 B1 * 10/2013 Kherani .............. H04L 63/0823
            380/229
(Continued)

FOREIGN PATENT DOCUMENTS

KR   10-2005-0007750 A    1/2005
KR   10-2012-0111601      10/2012
(Continued)

OTHER PUBLICATIONS

Bibmeyer, N. et al., "A Generic Public Key Infrastructure for Securing Car-to-X Communication", 18th ITS World Congress, Orlando, USA, vol. 14, 2011.*
(Continued)

*Primary Examiner* — Jung Kim
*Assistant Examiner* — Christopher Ruprecht
(74) *Attorney, Agent, or Firm* — Mintz Levin Cohn Ferris Glovsky and Popeo, P.C.; Kongsik Kim (57) ABSTRACT

A method for issuing a certificate signing request (CSR) certificate in a vehicle-to-anything (V2X) communication environment includes: receiving, at a first server, a certificate issuance request message including vehicle identification
(Continued)

information transmitted from a communication module of the vehicle; determining, by a second server, whether a CSR certificate corresponding to the vehicle identification information has already been issued with reference to a database; and determining, by the second server, whether to issue the corresponding CSR certificate or whether to generate an error message, based on the determination of whether the corresponding CSR certificate has already been issued.

13 Claims, 3 Drawing Sheets

(51) Int. Cl.
| | | |
|---|---|---|
| *H04L 29/08* | (2006.01) | |
| *H04W 12/04* | (2009.01) | |
| *H04W 12/06* | (2009.01) | |
| *H04W 4/04* | (2009.01) | |

(52) U.S. Cl.
CPC ......... *H04W 12/04* (2013.01); *H04L 2209/84* (2013.01); *H04W 4/046* (2013.01); *H04W 12/06* (2013.01)

(56) References Cited

U.S. PATENT DOCUMENTS

| | | | |
|---|---|---|---|
| 2008/0027602 A1* | 1/2008 | Yeap ........................ | B60R 25/04 701/31.4 |
| 2008/0232583 A1* | 9/2008 | Di Crescenzo ......... | H04L 9/002 380/44 |
| 2008/0232595 A1* | 9/2008 | Pietrowicz ......... | G06Q 20/3829 380/277 |
| 2009/0201139 A1* | 8/2009 | Zimmermann ....... | H04L 9/3268 340/426.13 |
| 2009/0235071 A1* | 9/2009 | Bellur ................... | H04L 9/3268 713/158 |
| 2009/0259841 A1* | 10/2009 | Laberteaux ........... | H04L 9/3268 713/156 |
| 2010/0031025 A1* | 2/2010 | Zhang ................. | H04L 63/0823 713/156 |
| 2011/0083011 A1* | 4/2011 | DiCrescenzo .......... | H04L 9/006 713/158 |
| 2011/0191581 A1* | 8/2011 | Shim ....................... | H04L 67/12 713/158 |
| 2011/0213968 A1* | 9/2011 | Zhang .................... | H04L 63/20 713/158 |
| 2011/0258435 A1* | 10/2011 | Bellur ................... | H04L 9/3273 713/158 |
| 2015/0339334 A1* | 11/2015 | Hanke ............... | G06F 17/30725 707/736 |

FOREIGN PATENT DOCUMENTS

| | | |
|---|---|---|
| KR | 10-2012-0128994 | 11/2012 |
| KR | 10-2013-0139725 A | 12/2013 |
| KR | 20-2013-0139725 | 12/2013 |

OTHER PUBLICATIONS

Lee, Y.S. et al., "Security Technology for V2X Communication", Jounal of the Korea Institute of Information Security & Cryptology, vol. 24, Issue 2, pp. 28-34 (Apr. 2014).

"PKI: Public Key Infrastructure", http://anyflow.net/295, Nov. 12, 2007, 3 pages.

* cited by examiner

METHOD AND SYSTEM FOR ISSUING CSR CERTIFICATE FOR VEHICLE-TO-ANYTHING COMMUNICATION

CROSS-REFERENCE TO RELATED APPLICATION

This application claims the benefit of and priority to Korean Patent Application No. 10-2014-0127418, filed on Sep. 24, 2014 in the Korean Intellectual Property Office, the disclosure of which is incorporated herein in its entirety by reference.

TECHNICAL FIELD

The present disclosure relates to a method and system for issuing a certificate signing request (CSR) certificate for vehicle-to-anything (V2X) communication, and more particularly, to a method and system for issuing a CSR certificate used to issue an anonymous certificate in V2X communication via a wireless access in vehicular environment (WAVE) communication scheme.

BACKGROUND

IEEE 1609.2 defines a security framework among IEEE 1609 series as standards related to wireless access in vehicular environment (WAVE). However, this standard does not define details, such as distinguished name (DN) (e.g., an array of attribute-value pair for distinguishing between certificate entities, etc.), for issuing a certificate signing request (CSR) certificate (i.e., certificate for giving authority to request issuance of an anonymous certificate) used to issue an anonymous certificate, ISSUER, and the like. Thus, a stable method that defines detailed items for issuing a CSR certificate and issuing a CSR certificate to a qualified subject is needed.

SUMMARY

The present disclosure has been made to solve the above-mentioned problems occurring in the related art while advantages achieved by the related art are maintained intact.

An aspect of the present disclosure provides a method and a system for issuing a certificate signing request (CSR) certificate in a vehicle-to-anything (V2X) communication environment, capable of effectively and safely identifying a vehicle which requests issuance of a certificate, and issuing a reliable CSR certificate used for requesting issuance of an anonymous certificate, thus providing a safe V2X communication environment.

According to embodiments of the present disclosure, a certificate issuing method for issuing a certificate signing request (CSR) certificate to a vehicle for vehicle-to-anything (V2X) communication, includes: receiving, at a first server, a certificate issuance request message including vehicle identification information transmitted from a communication module of a vehicle; determining, by a second server, whether a CSR certificate corresponding to the vehicle identification information has already been issued with reference to a database; and determining, by the second server, whether to issue the corresponding CSR certificate or whether to generate an error message, based on the determination of whether the corresponding CSR certificate has already been issued.

The communication module of the vehicle may be a module supporting wireless access in vehicular environment (WAVE) communication.

The first server may be a registration authority (RA) server operated in a registration agency for relaying certification registration, and the second server may be a certificate authority (CA) server of a certification agency for generating, issuing, and managing a certificate.

The communication module of the vehicle may i) receive the CSR certificate issued by the second server, ii) store and manage the received CSR certificate in a memory according to a certificate management entity (CME) standard, and iii) use the CSR certificate to request issuance of an anonymous certificate in V2X communication.

The determining of whether the corresponding CSR certificate has already been issued may include: i) requesting a vehicle management system, which stores and manages identification information of each vehicle in a network, to verify whether the vehicle identification information is valid, before issuance of the CSR certificate, ii) receiving a corresponding verification result, and iii) when the verification is successful, issuing the CSR certificate.

The determining of whether the corresponding CSR certificate has already been issued may further include: storing monitoring log information regarding the corresponding CSR certificate already issued to correspond to the vehicle identification information in the database and managing the same, before the error message is generated, wherein a checking service of the corresponding monitoring log information may be provided in response to a request through the vehicle management system in a network.

The determining of whether the corresponding CSR certificate has already been issued may further include: transmitting corresponding error notification information based on the error message to a previously registered e-mail address or mobile communication terminal number of a user via an e-mail or short message service (SMS).

The certificate issuing method may further include: discarding the corresponding CSR certificate, which has already been issued, from the database, in response to a discard request from the user through the vehicle management system in a network.

According to embodiments of the present disclosure, a certificate issuing system for issuing a reliable certificate signing request (CSR) certificate to a vehicle for vehicle-to-anything (V2X) communication, includes: a certificate issuer configured to: i) receive vehicle identification information transmitted from a communication module of the vehicle, ii) determine whether a CSR certificate corresponding to the received vehicle identification information has already been issued with reference to a database, and iii) issue the corresponding CSR certificate when there is no corresponding CSR certificate that has already issued; and an error transmitter configured to generate an error message when there is a corresponding CSR certificate that has already been issued.

The communication module of the vehicle may be a module supporting wireless access in vehicular environment (WAVE) communication.

The certificate issuing system may further include a registration authority (RA) server operated in a registration agency for relaying certificate registration, wherein the RA server includes a certificate processor configured to transmit the vehicle identification information transmitted by the communication module of the vehicle to the CA server and to transmit the CSR certificate issued by the CA server to the communication module of the vehicle, and the certificate issuer and the error transmitter are included in a certificate authority (CA) server of a certification agency for generating, issuing, and managing a certificate.

The CSR certificate received by the communication module of the vehicle through the RA server may be stored and managed in a memory according to a certificate management entity (CME) standard, and used to request issuance of an anonymous certificate in vehicle-to-anything (V2X) communication.

Before issuing the CSR certificate, the certificate issuer may i) request the vehicle management system, in a network, which stores and manages identification information regarding each vehicle to verify whether the vehicle identification information is valid, ii) receive a corresponding verification result, and iii) when the verification is successful, the certificate issuer may issue the CSR certificate.

Before generating the error message, the error transmitter may store and manage monitoring log information regarding the corresponding CSR certificate which has already been issued to correspond to the vehicle identification information in the database, and a checking service of the corresponding monitoring log information may be provided in response to a request through the vehicle management system in a network.

The certificate issuing system may further include: an error processor configured to transmit corresponding error notification information based on the error message transmitted from the error transmitter, to a previously registered e-mail address or mobile communication terminal number of a user via an e-mail or short message service (SMS).

The certificate issuing system may further include: a certificate discarding unit configured to discard the corresponding CSR certificate which has already been issued, from the database in response to a discard request from the user through the vehicle management system in a network.

Furthermore, according to embodiments of the present disclosure, a non-transitory computer readable medium containing program instructions for issuing a certificate signing request (CSR) certificate to a vehicle for vehicle-to-anything (V2X) communication may include: program instructions that receive a certificate issuance request message including vehicle identification information transmitted from a communication module of the vehicle; program instructions that determine whether a CSR certificate corresponding to the vehicle identification information has already been issued with reference to a database; and program instructions that determine whether to issue the corresponding CSR certificate or whether to generate an error message, based on the determination of whether the corresponding CSR certificate has already been issued.

BRIEF DESCRIPTION OF THE DRAWINGS

The above and other objects, features and advantages of the present disclosure will be more apparent from the following detailed description taken in conjunction with the accompanying drawings. In each drawing, like reference numerals refer to like elements. Also, in the drawings, some elements may be exaggerated, omitted, or schematically illustrated. The size of each element does not entirely reflect an actual size, and thus, details described herein are not limited by the relative sizes or interval of elements illustrated in each drawing.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one server including at least one control unit (not shown). The term "control unit" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit, whereby the apparatus is known in the art to be suitable for issuing a CSR certificate for V2X communication.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. Also, the detailed descriptions of the relevant known functions and/or configurations are omitted. In the below-disclosed details, descriptions will focus on elements necessary to understand operations according to various embodiments, and the detailed descriptions on elements which unnecessarily obscure the important points of the descriptions will be omitted.

Figure 1:
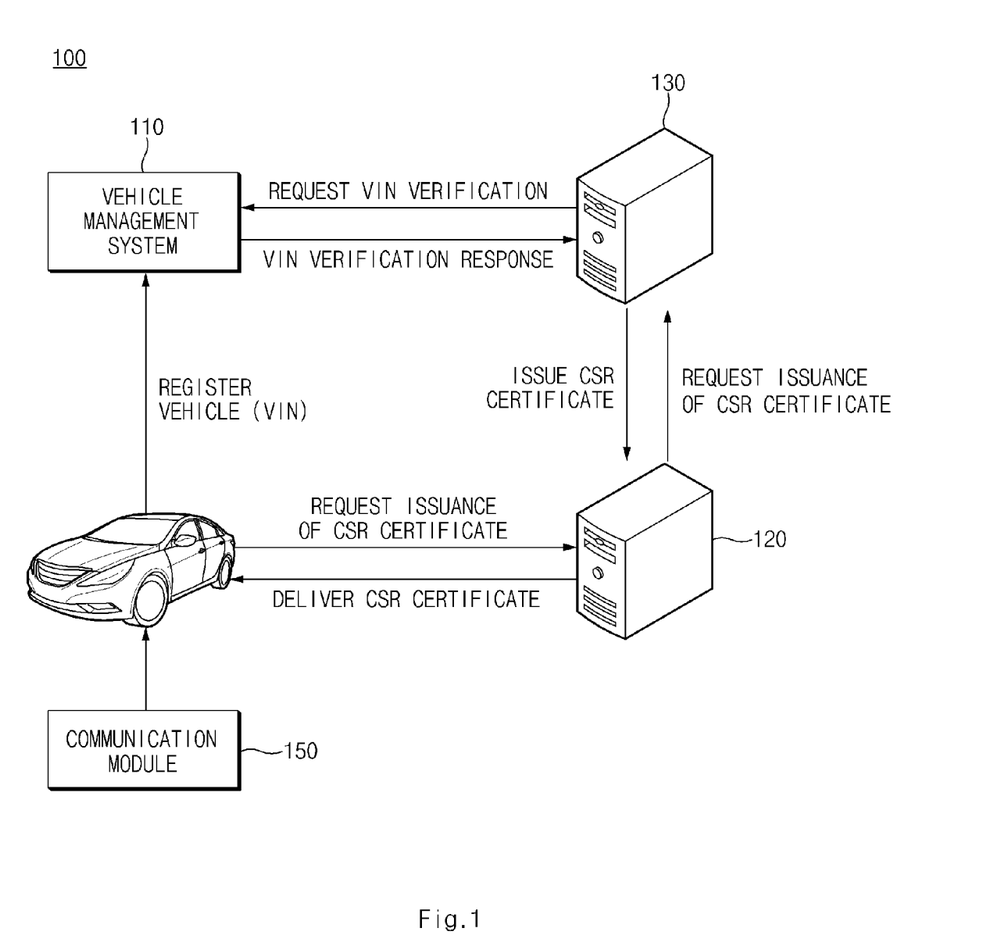
FIG. 1 is a view illustrating a certificate issuing system according to embodiments of the present disclosure.

FIG. 1 is a view illustrating a certificate issuing system 100 according to embodiments of the present disclosure.

Referring to FIG. 1, the certificate issuing system 100 according to embodiments of the present disclosure may include a vehicle management system 110, a registration authority (RA) server 120 (alternatively referred to as a "first server"), and a certificate authority (CA) server 130 (alternatively referred to as a "second server"). The RA server 120 may be a registration agency server such as a financial company (e.g., bank, security company, etc.), or the like, for relaying registration such as generation, issuance, and the like, of a certificate by a certification agency. The CA server 130 may be a server of a certification agency (e.g., Koscom Corp., KICA Inc., etc.) for generating, issuing, and managing a certificate to issue a certificate for each vehicle. However, the present disclosure is not limited thereto and, according to circumstances, the RA server 120 and the CA server 130 may be integrated and operated in a network such as a mobile communication network, the Internet, and the like.

Here, a vehicle may include the communication module 150 supporting vehicle-to-anything (V2X) wireless communication, and the communication module 150 may support mobile communication such as WCDMA, LTE, WiFi, and the like, and, in particular, the communication module 150 may support V2X communication between terminals of vehicles or between a terminal of the vehicle and a terminal of other system through a wireless access in vehicular environment (WAVE) wireless communication scheme.

A WAVE communication protocol applicable to the communication module 150, a combination of IEEE802.11p standard and IEEE P1609 standard, is a communication standard supporting high speed communication between vehicles and communication between a vehicle and an infrastructure, so as to be utilized for establishing various next-generation intelligent transport systems (ITSs). The WAVE communication scheme may be used to relay a roadside base station or support direct vehicle-to-vehicle (V2V) communication between vehicles. The communication module 150 supporting the WAVE communication scheme may include a physical layer and a media access control (MAC) layer supporting a communication delay of 10 msec or less at a maximum vehicle speed of 200 km/h, a communication radius of 1 km, a maximum transfer rate of 54 Mbps, a usage frequency ranging from 5.850 to 5.925 GHz, a channel bandwidth of 10 MHz, seven channel numbers, and the like, and guarantee high speed mobility, or the like.

In order to support issuance of a CSR certificate according to embodiments of the present disclosure, the communication module 150 of the vehicle may communicate with the vehicle management system 110, the server 120 or 130 (i.e., the first or second server), and the like, to transmit and receive required information according to reception of a required request signal through manipulation of a user such as a driver, or the like, or any other method. In addition, the communication module 150 of the vehicle may be connected to various human-machine interface (HMI) electronic devices used by the user, such as a mobile communication terminal (e.g., a smartphone, a personal digital assistant (PDA), a portable multimedia player (PMP), etc.), a vehicle-mounted navigation terminal, and the like, and communicate with the vehicle management system 110, the server 120 or 130, and the like, to transmit and receive required information according to reception of a required request signal through manipulation of the user such as the driver, or the like, via an HMI or through any other method.

If necessary, the communication module 150 of the vehicle may communicate with the vehicle management system 110, the server 120 or 130 (i.e., the first or second server), and the like to transmit and receive required information according to reception of a required request signal though manipulation of the user such as the driver, or the like, via a user interface provided in the communication module 150 of the vehicle or through any other method. The vehicle management system 110 and the server 120 or 130 may communicate with each other by a network, e.g., a mobile communication network, the Internet, and the like. Furthermore, if necessary, the communication module 150 of the vehicle may also communicate with the vehicle management system 110, the server 120 or 130, and the like, via the network, e.g., a mobile communication network, the Internet, and the like.

In general, when a vehicle is manufactured by a vehicle manufacturer, the communication module 150 of the vehicle stores vehicle identification information such as a vehicle identification number (VIN) in a certain memory and manages the same. Also, when the vehicle is released from the manufacturer after the communication module 150 is installed therein, or when a vehicle system is first booted after replacement of the WAVE communication module 150 including a certificate management entity (CME) in a repair shop, the communication module 150 of the vehicle may cause the VIN to be transmitted to the vehicle management system 110 of the manufacturer, or the like, through V2X communication, or the like, in order to release or register the vehicle, thus allowing the VIN to be stored and managed in the vehicle management system 110. The vehicle management system 110 may register and manage the VIN, or the like, of each vehicle with the manufacturer, a repair shop, a vehicle registration office of a local government, and the like, and provide a certification result with respect to a certification or verification request of a certification agency.

In order for the communication module 150 of the vehicle to support V2X communication, a CSR certificate is required to be issued (e.g., in units of year) through the RA server 120 and the CA server 130 of a certification of a certification agency, together with management of the VIN in the vehicle management system 110. The CSR certificate is a certificate that gives authority to request issuance of an anonymous certificate, and the anonymous certificate may be issued (e.g., in units of five minutes) to maintain security such as encryption, or the like, in communication and certification.

For example, when the system of the vehicle is booted, the communication module 150 of the vehicle checks whether there is a CSR certificate. When a CSR certificate does not exist, the communication module 150 of the vehicle may request the RA server 120 (i.e., first server) to issue a CSR certificate through a request message including the VIN, through V2X communication, or the like. The RA server 120, a server of a registration agency such as a financial company (e.g., bank, security company, etc.), or the like, that relays registration such as generation, issuance, and the like, of a certificate by a certification agency, delivers a request message including the VIN received from the vehicle to the CA server 130.

The CA server 130 (e.g., second server), a server of a certification agency (e.g., Koscom Corp., KICA Inc., etc.) that processes a request for issuance of a certificate with respect to each vehicle, delivers issued certificates, manages issued certificates, and determines whether there is a CSR certificate issued to correspond to the VIN of the received request message. When there is no issued certificate, the CA server 130 requests the vehicle management system 110 to verify whether the VIN is valid. The CA server 130 receives a verification result regarding the VIN from the vehicle management system 110, and when validity information regarding the corresponding VIN is included in the verification result so verification is successful, the CA server 130 issues a corresponding CSR certificate, stores and manages the CSR certificate in a storage unit, such as a database, or the like, and delivers the issued corresponding CSR certificate to the RA server 120.

The RA server 120 delivers the CSR certificate for the corresponding VIN received from the CA server 130 to the corresponding vehicle. Meanwhile, the communication module 150 of the vehicle safely stores and manages the CSR certificate in a certain memory according to a certificate management standard, such as a certificate management entity (CME), or the like, as defined in IEEE 1609.2.

In particular, the certificate issuing system 100 according to embodiments of the present disclosure effectively and safely identifies the certificate issuance target vehicle through the RA server 120 and the CA server 130 and issues a reliable CSR certificate, thus preventing an attacker from unjustly obtaining a certificate and transmitting false information to other vehicle to lead to disturbances in the V2X communication environment in advance. Also, the VIN, or the like, is publically available information, and thus, in response to an attack to request issuance of a certificate by spoofing a VIN of someone else by an attacker, and the like, the certificate issuing system 100 communicates with the vehicle management system 110 of an individual manufacturer, a repair shop, a vehicle registration office of a local government, and the like, to discard an issued certificate and allow for re-issuance of a certificate.

Figure 2:
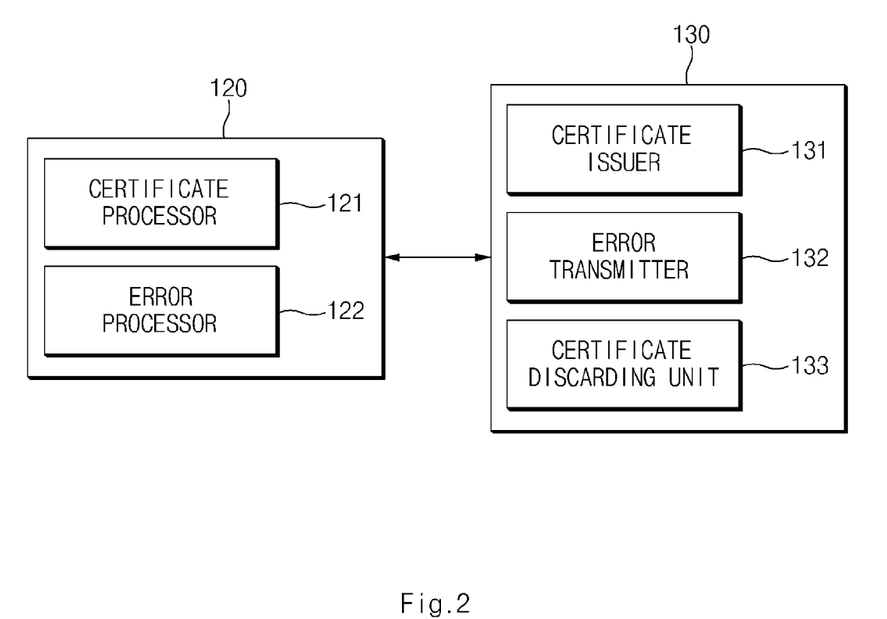
FIG. 2 is a specific block diagram of a registration authority (RA) server and a certificate authority (CA) server of FIG. 1.

To this end, as illustrated in FIG. 2, the RA server 120 relaying between the communication module 150 of the vehicle and the CA server 130 may include a certificate processor 121 and an error processor 122, while the CA server 130 for generating, issuing, and managing a CSR certificate with respect to each vehicle may include a certificate issuer 131, an error transmitter 132, and a certificate discarding unit 133. The components of the RA server 120 and the CA server 130 may be implemented by hardware, software, or a combination thereof.

First, the components of the RA server 120 and the CA server 130 (i.e., first server and second server, respectively) will be described briefly.

The certificate processor 121 of the RA server 120 transmits the VIN transmitted from the communication module 150 of the vehicle to the CA server 130, and transmits a CSR certificate issued by the CA server 130 to the communication module 150 of the vehicle. The certificate issuer 131 of the CA server 130 determines whether a CSR certificate corresponding to the VIN transmitted through the RA server 120 by the communication module 150 of the vehicle has already been issued with reference to a database. When there is no issued CSR certificate according to the result of the determination, the certificate issuer 131 of the CA server 130 issues the corresponding CSR certificate. In this case, before issuing the CSR certificate, the certificate issuer 131 requests the vehicle management system 110, in the network, that stores and manages identification information of each vehicle to verify whether the VIN is valid, receives a corresponding verification result, and issues the corresponding CSR certificate when the verification is successful.

When there is a CSR certificate that has already been issued, based on the determination result from the certificate issuer 131, the error transmitter 132 of the CA server 130 generates a corresponding error message. Before generating the corresponding error message, the error transmitter 132 may store and manage monitoring log information with respect to the corresponding CSR certificate already issued to correspond to the VIN, in a database, and may provide a checking service of the corresponding monitoring log information according to a request through the vehicle management system 110 in the network. The error processor 122 of the RA server 120 may transmit error notification information according to the error message from the error transmitter 132 to a previously registered e-mail address or mobile communication terminal number of the user via an e-mail, a short message service (SMS), and the like.

In response to a request for discarding the already issued CSR certificate from the user through the vehicle management system 110 in the network, the certificate discarding unit 133 of the CA server 130 may delete the corresponding CSR certificate already issued to correspond to the VIN, from the database, thus discarding the CSR certificate.

As the already issued CSR certificate is discarded, a CSR certificate may be re-issued through the communication module 150 of the vehicle, and the communication module 150 of the vehicle stores and manages the corresponding CSR certificate received through the RA server 120 in the memory according to the CME standard, and allows the corresponding CSR certificate to be used for requesting issuance of an anonymous certificate in V2X communication.

Figure 3:
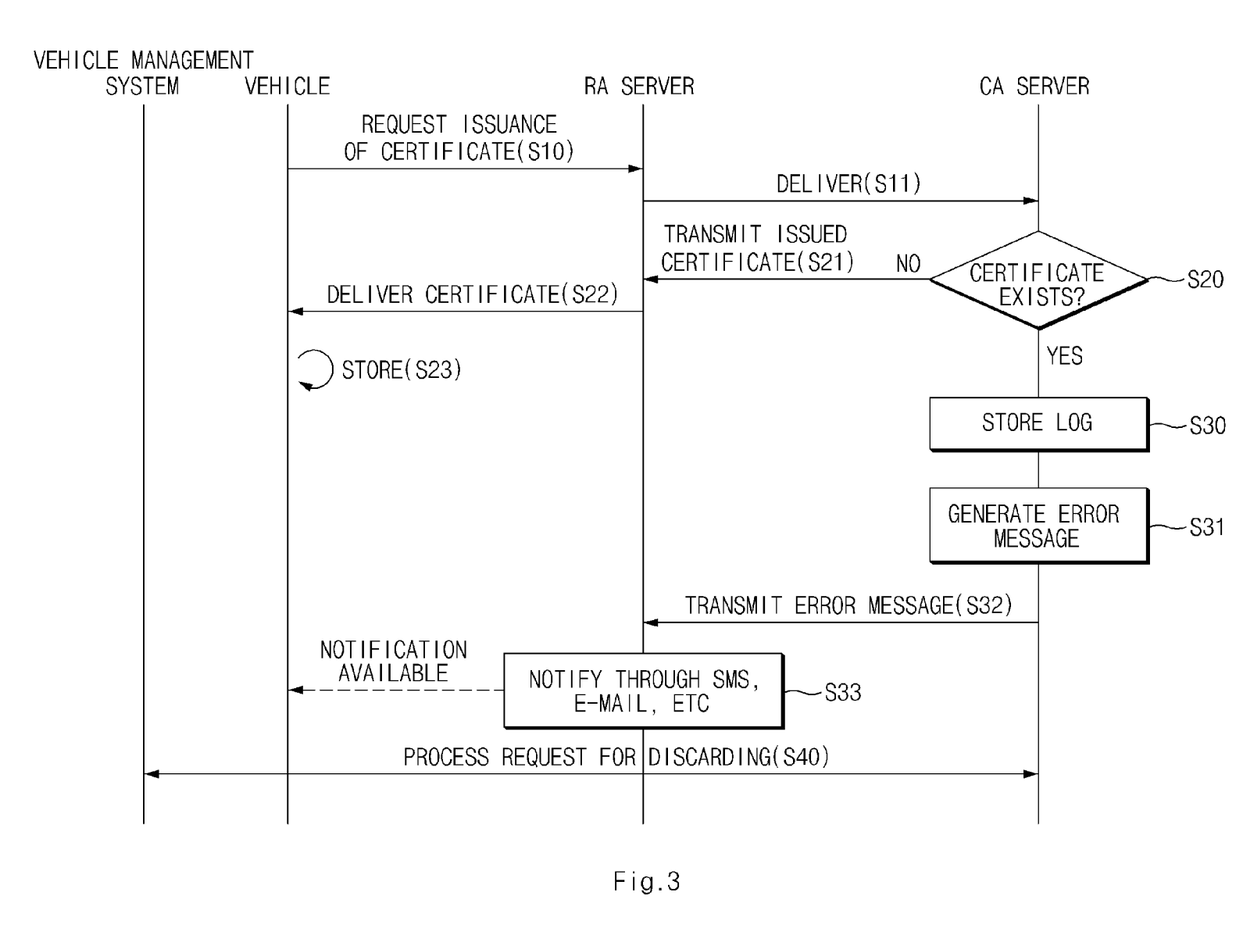
FIG. 3 is a flow chart illustrating a process of issuing a CSR certificate of the certificate issuing system according to embodiments of the present disclosure.

Hereinafter, an operation of the certificate issuing system 100 according to embodiments of the present disclosure will be described in detail with reference to the flow chart of FIG. 3.

First, when the system of the vehicle is booted, the communication module 150 of the vehicle determines whether there is a CSR certificate in the managed memory thereof. When a CSR certificate does not exist, the communication module 150 of the vehicle may request the RA server 120 to issue a CSR certificate through a request message including a VIN through V2X communication, or the like, in operation S10. Accordingly, the certificate processor 121 of the RA server 120 delivers the request message including the VIN received from the vehicle to the CA server 130 in operation S11.

The certificate issuer 131 of the CA server 130 searches the managed DB, or the like, to determine whether a CSR certificate corresponding to the VIN of the received request message has been issued in operation S20. When a certificate has not been issued, first, the certificate issuer 131 issues the corresponding CSR certificate, stores and manages the issued CSR certificate in a storage unit such as the database, or the like, and transmits the corresponding issued CSR certificate to the RA server 120 in operation S21. Before issuing the certificate, as illustrated in FIG. 1, the certificate issuer 131 may communicate with the vehicle management system 110 to request the vehicle management system 110 to verify whether the corresponding VIN is valid, and when a response indicating that the verification is successful is received, the certificate issuer 131 may issue the corresponding CSR certificate.

The certificate processor 121 of the RA server 120 may deliver the CSR certificate with respect to the corresponding VIN received from the CA server 130 to the corresponding vehicle in operation S22, and the communication module 150 of the vehicle may safely store and manage the CSR certificate in a certain memory according to a certificate management standard such as a CME, or the like, as defined in IEEE 1609.2, in operation S23.

However, when there is no previously issued certificate in the database, or the like, in operation S20, the error transmitter 132 may separately store and manage monitoring log information including the CSR certificate with respect to the corresponding VIN in the database, or the like, based on corresponding notification from the certificate issuer 131 in operation S30, generate an error message including certain certificate error information in operation S31, and transmit the generated error message to the RA server 120 in operation S32. As for the monitoring log information regarding the corresponding VIN, contains an error and is stored and managed in the database, or the like, a checking service may be provided to a screen of a corresponding user interface by the error transmitter 132, at any time, through the vehicle management system 110, in response to a request from the user such as a vehicle owner, a driver, and the like.

Accordingly, the error processor 122 of the RA server 120 may transmit error notification information based on the corresponding error message to a previously registered e-mail address, mobile communication terminal number, and the like, of the user such as a vehicle owner, a driver, and the like, via an e-mail, a short message service (SMS), and the like, in order to inform the user about hacking or a situation that an attacker attempts to unjustly obtain a certificate and transmit false information to other vehicle to lead to disturbances, in operation S33. Since the CSR certificate is issued at a time when the vehicle, after the communication module 150 is installed therein, is released from a manufacturer or when the vehicle system is first booted after replacement of the WAVE communication module 150 including CME in a repair shop, if there is a previously issued certificate, it may be considered as an unjustified request from an attacker or as an error. In this case, by notifying the user of the error, an occurrence of a situation in which the attacker is to spoof identification information of other vehicle, and the like, can be prevented in advance. According to circumstances, the error processor 122 may transmit the corresponding error notification information to the communication module 150, such that the driver, or the like, may view the corresponding error through a user interface provided in the communication module 150 or through a mobile communication terminal (e.g., smartphone, PDA, PMP, etc.) or a navigation terminal connected to the communication module 150.

The vehicle owner, the driver, and the like, may recognize the corresponding error notification information received via an e-mail, SMS, and the like, through the mobile communication terminal, a PC, the communication module 150, and the like, and request that the previously issued certificate should be discarded, through the vehicle management system 110 of an individual manufacturer, a repair shop, a vehicle registration office of a local government, and the like, and the vehicle owner, the driver, and the like, may perform the foregoing procedure again to obtain a reliable CSR certificate in operation S40.

For example, the vehicle owner, the driver, and the like, may transmit a discard request message including the corresponding VIN via the mobile communication terminal, the PC, or the communication module 150, or an HMI connected thereto, or the like, in order to request the RA server 120 or the CA server 130 to discard the corresponding CSR certificate. When the discard request message is transmitted to the RA server 120, the RA server 120 may deliver the discard request message to the CA server 130. The certificate discarding unit 133 of the CA server 130 searches the managed database, and the like, and discard the issued CSR certificate corresponding to the VIN of the received discard request message. Accordingly, the corresponding vehicle may request issuance of a CSR certificate and obtain a reissued certificate according to the procedure of operations S10 to S23.

When the CSR certificate is re-issued, the communication module 150 of the vehicle stores and manages the corresponding CSR certificate in the memory according to the CME standard, and allows the CSR certificate to be used for requesting issuance of an anonymous certificate in V2X communication.

As described above, the certificate issuing system 100 according to embodiments of the present disclosure effectively and safely identifies the certificate issuance target vehicle and issues a reliable CSR certificate, thus preventing an attacker from unjustly obtaining a certificate and transmitting false information to other vehicle to lead to disturbances in the V2X communication environment in advance. Also, the VIN, or the like, among identification information of the vehicle, is publically available information, and thus, in response to an attack issuance of a certificate is requested by spoofing a VIN of someone else by an attacker, and the like, a previously issued certificate may be easily discarded through the vehicle management system 110 of an individual manufacturer, a repair shop, a vehicle registration office of a local government, and the like, and a certificate can be re-issued. In addition, when the certificate issuing system 100 communicates with the vehicle management system 110 of an individual manufacturer, a repair shop, a vehicle registration office of a local government, and the like, an infrastructure at the national level can be easily constructed.

The present disclosure described above may be variously substituted, altered, and modified by those skilled in the art to which the present disclosure pertains without departing from the scope and spirit of the present disclosure. Therefore, the present disclosure is not limited to the above-mentioned embodiments and the accompanying drawings.

What is claimed is:

1. A certificate issuing method for issuing a certificate signing request (CSR) certificate to a vehicle for vehicle-to-anything (V2X) communication in a network, the certificate issuing method comprising:

receiving, at a first server, a certificate issuance request message including vehicle identification information transmitted from a communication module of the vehicle;

determining, by a second server, whether a CSR certificate corresponding to the vehicle identification information has already been issued with reference to a database;

issuing, by the second server, the corresponding CSR certificate or generating an error message, based on the determination of whether the corresponding CSR certificate has already been issued;

transmitting, by the second server, corresponding error notification information based on the error message to a previously registered e-mail address or mobile communication terminal number of a user via e-mail or short message service (SMS);

discarding, by the second server, the corresponding CSR certificate, which has already been issued, from the database, in response to a discard request from the user through a vehicle management system in the network, based on the error notification information; and reissuing, by the second server, the corresponding CSR certificate according to the certificate issuance request message after discarding the corresponding CSR certificate.

2. The certificate issuing method according to claim 1, wherein the communication module of the vehicle is a module supporting wireless access in vehicular environment (WAVE) communication.

3. The certificate issuing method according to claim 1, wherein the first server is a registration authority (RA) server operated in a registration agency for relaying certification registration, and the second server is a certificate authority (CA) server of a certification agency for generating, issuing, and managing a certificate.

4. The certificate issuing method according to claim 1, wherein the communication module of the vehicle i) receives the CSR certificate issued by the second server, ii) stores and manages the received CSR certificate in a memory according to a certificate management entity (CME) standard, and iii) uses the CSR certificate to request issuance of an anonymous certificate in the V2X communication.

5. The certificate issuing method according to claim 1, wherein the determining of whether the corresponding CSR certificate has already been issued further comprises:
  i) requesting a vehicle management system, which stores and manages identification information of each vehicle in the network, to verify whether the vehicle identification information is valid, before issuance of the CSR certificate, ii) receiving a corresponding verification result, and iii) when the verification is successful, issuing the CSR certificate.

6. The certificate issuing method according to claim 1, wherein the determining of whether the corresponding CSR certificate has already been issued further comprises:
  storing monitoring log information regarding the corresponding CSR certificate already issued to correspond to the vehicle identification information in the database and managing the same, before the error message is generated,
  wherein a checking service of the corresponding monitoring log information is provided in response to a request through a vehicle management system in the network.

7. A certificate issuing system for issuing a certificate signing request (CSR) certificate to a vehicle for vehicle-to-anything (V2X) communication in a network, the certificate issuing system comprising:
  a plurality of processors configured to control an operation of the certificate issuing system;
  a certificate issuer embodied on one or more of the plurality of processors configured to: i) receive vehicle identification information transmitted from a communication module of the vehicle, ii) determine whether a CSR certificate corresponding to the received vehicle identification information has already been issued with reference to a database, and iii) issue the corresponding CSR certificate when there is no corresponding CSR certificate that has already been issued;
  an error transmitter embodied on one or more of the plurality of processors configured to generate an error message when there is a corresponding CSR certificate that has already been issued;
  an error processor embodied on one or more of the plurality of processors configured to transmit corresponding error notification information based on the error message transmitted from the error transmitter, to a previously registered e-mail address or mobile communication terminal number of a user via e-mail or short message service (SMS); and
  a certificate discarding unit embodied on one or more of the plurality of processors configured to discard the corresponding CSR certificate, which has already been issued, from the database, in response to a discard request from the user through a vehicle management system in the network, based on the error notification information,
  wherein the certificate issuer is further configured to reissue the corresponding CSR certificate according to a certificate issuance request message after discarding the corresponding CSR certificate.

8. The certificate issuing system according to claim 7, wherein the communication module of the vehicle is a module supporting wireless access in vehicular environment (WAVE) communication.

9. The certificate issuing system according to claim 7, further comprising:
  a registration authority (RA) server operated in a registration agency for relaying certificate registration; and
  a certificate authority (CA) server operated in a certification agency for generating, issuing, and managing a certificate, wherein
  the RA server includes the error processor and a certificate processor configured to transmit the vehicle identification information transmitted by the communication module of the vehicle to the CA server and to transmit the CSR certificate issued by the CA server to the communication module of the vehicle, and
  the CA server includes the certificate issuer, the error transmitter, and the certificate discarding unit.

10. The certificate issuing system according to claim 9, wherein the CSR certificate received by the communication module of the vehicle through the RA server is stored and managed in a memory according to a certificate management entity (CME) standard, and used to request issuance of an anonymous certificate in the vehicle-to-anything (V2X) communication.

11. The certificate issuing system according to claim 7, wherein, before issuing the CSR certificate, the certificate issuer i) requests a vehicle management system, in the network, which stores and manages identification information regarding each vehicle to verify whether the vehicle identification information is valid, ii) receives a corresponding verification result, and iii) when the verification is successful, the certificate issuer issues the CSR certificate.

12. The certificate issuing system according to claim 7, wherein, before generating the error message, the error transmitter stores and manages monitoring log information regarding the corresponding CSR certificate which has already been issued to correspond to the vehicle identification information in the database, and a checking service of the corresponding monitoring log information is provided in response to a request through the vehicle management system in the network.

13. A non-transitory computer readable medium containing program instructions executable by at least one processor for issuing a certificate signing request (CSR) certificate to a vehicle for vehicle-to-anything (V2X) communication in a network, wherein the program instructions when executed are configured to cause the processor to:
  receive a certificate issuance request message including vehicle identification information transmitted from a communication module of the vehicle;

determine whether a CSR certificate corresponding to the vehicle identification information has already been issued with reference to a database;

issue the corresponding CSR certificate or generate an error message, based on the determination of whether the corresponding CSR certificate has already been issued;

transmit corresponding error notification information based on the error message to a previously registered e-mail address or mobile communication terminal number of a user via e-mail or short message service (SMS);

discard the corresponding CSR certificate, which has already been issued, from the database, in response to a discard request from the user through a vehicle management system in the network, based on the error notification information; and reissue the corresponding CSR certificate according to the certificate issuance request message after discarding the corresponding CSR certificate.

\* \* \* \* \*